US008375434B2

(12) United States Patent
Cottrell et al.

(10) Patent No.: US 8,375,434 B2
(45) Date of Patent: Feb. 12, 2013

(54) SYSTEM FOR PROTECTING IDENTITY IN A NETWORK ENVIRONMENT

(75) Inventors: Lance M. Cottrell, San Diego, CA (US); Brian Brennet, El Cajon, CA (US); Daniel Tentler, San Diego, CA (US); Gene Anderson, Escondido, CA (US)

(73) Assignee: Ntrepid Corporation, Herndon, VA (US)

( * ) Notice: Subject to any disclaimer, the term of this patent is extended or adjusted under 35 U.S.C. 154(b) by 1169 days.

(21) Appl. No.: 11/722,497

(22) PCT Filed: Dec. 31, 2005

(86) PCT No.: PCT/US2005/047580
§ 371 (c)(1), (2), (4) Date: Dec. 3, 2007

(87) PCT Pub. No.: WO2006/072052
PCT Pub. Date: Jul. 6, 2006

(65) Prior Publication Data
US 2008/0196098 A1 Aug. 14, 2008

Related U.S. Application Data

(60) Provisional application No. 60/640,924, filed on Dec. 31, 2004.

(51) Int. Cl.
*H04L 29/06* (2006.01)
(52) U.S. Cl. ............. 726/12; 709/206; 726/23; 370/352
(58) Field of Classification Search .................. 709/206; 726/23; 370/352
See application file for complete search history.

(56) References Cited

U.S. PATENT DOCUMENTS

| 5,493,692 | A | 2/1996 | Theimer et al. |
|---|---|---|---|
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,768,391 | A | 6/1998 | Ichikawa |
| 5,812,865 | A | 9/1998 | Theimer et al. |
| 6,389,533 | B1 | 5/2002 | Davis et al. |
| 6,442,687 | B1 * | 8/2002 | Savage .......................... 713/156 |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |

(Continued)

FOREIGN PATENT DOCUMENTS

| EP | 1035702 | 9/2000 |
|---|---|---|
| WO | 98/00787 | 1/1998 |

OTHER PUBLICATIONS

Egevang et al, "The IP Network Address Translator (NAT)", RFC 1631, Feb. 4, 1998, retrieved from internet at: http://web.archive.org/web/19980204035129/http://faqs.org/rfc1631.html, 9 pages.

(Continued)

*Primary Examiner* — Jeffrey Pwu
*Assistant Examiner* — Michael D Anderson
(74) *Attorney, Agent, or Firm* — Squire Sanders (US) LLP

(57) ABSTRACT

A system for protecting identify of network devices (102, 104, and 106) in a network environment. The system includes an apparatus having an interface to the network for completing connections to destination devices (152, 154, and 156) on the public side of the network. The apparatus includes a masking element (140) for associating at least one masking identifier with a communication from the network device and masking the identifier of the network device from the destination device.

44 Claims, 10 Drawing Sheets

U.S. PATENT DOCUMENTS

| | | | |
|---|---|---|---|
| 6,581,057 B1 | 6/2003 | Witbrock et al. | |
| 6,591,291 B1 | 7/2003 | Gabber et al. | |
| 6,615,357 B1 | 9/2003 | Boden et al. | |
| 6,745,180 B2 | 6/2004 | Yamanoue | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,874,127 B2 | 3/2005 | Newell et al. | |
| 6,928,437 B2 | 8/2005 | Shibuya et al. | |
| 6,937,976 B2 | 8/2005 | Apte | |
| 6,968,333 B2 | 11/2005 | Abbott et al. | |
| 7,007,228 B1 | 2/2006 | Carro | |
| 7,051,116 B1 * | 5/2006 | Rodriguez-Val et al. | 709/245 |
| 7,055,101 B2 | 5/2006 | Abbott et al. | |
| 7,058,893 B2 | 6/2006 | Abbott et al. | |
| 7,058,894 B2 | 6/2006 | Abbott et al. | |
| 7,062,715 B2 | 6/2006 | Abbott et al. | |
| 7,068,647 B2 * | 6/2006 | Fangman et al. | 370/352 |
| 7,069,319 B2 | 6/2006 | Zellner et al. | |
| 7,076,737 B2 | 7/2006 | Abbott et al. | |
| 7,080,322 B2 | 7/2006 | Abbott et al. | |
| 7,089,497 B2 | 8/2006 | Abbott et al. | |
| 7,107,539 B2 | 9/2006 | Abbott et al. | |
| 7,137,069 B2 | 11/2006 | Abbott et al. | |
| 7,155,456 B2 | 12/2006 | Abbott, III et al. | |
| 7,203,906 B2 | 4/2007 | Abbott et al. | |
| 7,243,141 B2 * | 7/2007 | Harris | 709/245 |
| 7,372,713 B2 | 5/2008 | Kuliyampattil et al. | |
| 7,444,594 B2 | 10/2008 | Abbott et al. | |
| 7,467,398 B2 | 12/2008 | Fellenstein et al. | |
| 7,469,299 B2 | 12/2008 | Johnston | |
| 7,526,458 B2 | 4/2009 | Flinn et al. | |
| 7,620,989 B1 * | 11/2009 | Couturier et al. | 726/23 |
| 7,640,215 B2 | 12/2009 | Wang et al. | |
| 7,984,169 B2 | 7/2011 | Brunell et al. | |
| 7,992,204 B2 | 8/2011 | Shraim et al. | |
| 2002/0038431 A1 | 3/2002 | Chesko et al. | |
| 2002/0044152 A1 | 4/2002 | Abbott, III et al. | |
| 2002/0054130 A1 | 5/2002 | Abbott, III et al. | |
| 2002/0087641 A1 * | 7/2002 | Levosky | 709/206 |
| 2002/0099817 A1 | 7/2002 | Abbott et al. | |
| 2002/0116531 A1 | 8/2002 | Chu | |
| 2003/0028599 A1 | 2/2003 | Kolsky | |
| 2003/0046401 A1 | 3/2003 | Abbott et al. | |
| 2003/0080997 A1 | 5/2003 | Fuehren et al. | |
| 2004/0249974 A1 * | 12/2004 | Alkhatib et al. | 709/245 |
| 2005/0283469 A1 | 12/2005 | Veteska et al. | |
| 2006/0059091 A1 | 3/2006 | Wang et al. | |
| 2006/0259957 A1 | 11/2006 | Tam et al. | |
| 2006/0265495 A1 | 11/2006 | Butler et al. | |
| 2008/0141117 A1 | 6/2008 | King et al. | |

OTHER PUBLICATIONS

Notice of Acceptance corresponding to Australian Patent Application No. 2005321876 dated Jun. 22, 2011.

Patent Examination Report No. 2, dated Aug. 30, 2012, in corresponding AU Patent Application No. 2011211384, pp. 1-3.

Patent Examination Report No. 3, dated Nov. 21, 2012, in corresponding AU Patent Application No. 2011211384, 4 pages.

* cited by examiner

SYSTEM FOR PROTECTING IDENTITY IN A NETWORK ENVIRONMENT

REFERENCE TO EARLIER-FILED APPLICATION

This application claims priority under Title 35, United States Code, Section 119(e), to U.S. Provisional Application Ser. No. 60/640,924 titled "System for Protecting Identity in a Network Environment," filed Dec. 31, 2004, which is incorporated herein, in its entirety, by this reference.

BACKGROUND OF THE INVENTION

1. Field of the Invention

This invention relates generally to network communication systems. In particular, this invention relates to protecting the identity of the users of a network system.

2. Related Art

As global computer networks, such as the Internet, continue to grow globally at a rapid pace, an increasing number of people and businesses from around the world are accessing these networks for both business and personal activities. As a result, networks such as the Internet have become a virtual community where people communicate with each other by sending and receiving electronic, voice and image messages for both business and pleasure. These communications may include sharing ideas and information, sending personal and business messages back and forth, researching information, expressing opinions and ideas both personal and political, and conducting business negotiations and transactions (generally known as "electronic commerce" or "e-commerce"). In response to this new electronic activity, businesses and certain individuals attempt to identify and track individual Internet users for numerous purposes, including but not limited to, advertising, market research, customizing information for Internet sites (i.e., "websites"), snooping and eavesdropping on communications, as well as fraud and other malicious activities. Many of these attempts may constitute threats to the individual privacy of users of these networks because they attempt to gain personal information about the user and the user's activities online (generally referred to as "online activities"), often without the user's consent or knowledge.

These threats acquire information about the user by logging or tracking a user's Internet Protocol ("IP") address (the electronic address that specifically identifies a user's computer to the network) or by installing programs or files on the user's computer such as "cookies," ActiveX™ applications, JavaScript™ files, spyware, or hostile programs such as viruses. These threats allow an outside user, be it a business or an individual entity, to perform such tasks as identifying the user, obtaining the user's personal information that is stored on his/her computer (including names, addresses, private financial files, and/or other confidential, private and/or sensitive information), as well as tracking the user's activities on the Internet, including recording every website visited or every e-mail sent or received by the user. Malicious programs such as viruses may also be installed on the user's computer that can modify, erase or destroy the user's operating system or personal files.

Unfortunately, many people that utilize the Internet do not understand how networks such as the Internet function nor do they generally appreciate the number and types of threats that they may experience once they connect (i.e., "log-on") to the Internet. With respect to the threat of an outside user acquiring information about the user by logging or tracking the user's IP address, this threat arises because when the user surfs the Internet, his computer may make a direct, unprotected and unsecure connection to the server where the requested information is stored. For that server to send Web content back to the user, it must know the user's computer's IP address. Once an IP address is obtained by an outside user, that IP address can be used to obtain additional information such as the user's domain name, the part of the world the user is located in, the name of the user's Internet Service Provider ("ISP"), and additional details about the user's corporate network.

Obtaining this additional information may be referred to, in general, as "Internet Counter-Intelligence." Possible risks associated with Internet Counter-Intelligence techniques directed against the user may include possible exposure of the user's operations, future development plans or intentions, unintentional exposure of confidential client information or research, as well as subjecting the user to an influx of spam e-mail or hacker attacks initiated by automated counter-probes. In addition, the outside user may alter the content returned to the user based on the user's IP address, providing different, even misleading, content to the user based on the geographical source of the query.

Enterprise Web administrators have a number of analytical tools at their disposal that give them the ability to not only detect and analyze inbound traffic to their websites, but also to perform many of these Internet Counter Intelligence techniques. These tools are commonly referred to in the Information Technology ("IT") industry as "Web Analytics." Web Analytics employs tools and services that can gather user data from the Web server logs or collect it directly from the users' browsers. These services are particularly adept at providing a global view of visitor activity on multiple enterprise sites. Performing Web Analytics makes it possible to track visitor activity, including the geographic locations of visitors to a website. The addition of a browser plug-in gives these Web administrators the ability to see link and element viewer activity when visitors view individual Web pages on their sites. Web Analytics can also analyze the surfing behavior of visitors to a website, tracking the pages within the site that are most frequently accessed, and the files that are downloaded. The result of the information that is collected is provided in the form of tables, charts, and graphs. It is this aspect of the functionality of Web Analytics that can identify specific IP addresses and domain names, which in turn can be used to prevent access from locations that are deemed a competitive threat.

Past approaches at protecting users connected to the Internet include using "firewalls" to block certain types of threats, virus protection programs for detecting malicious programs, and spyware and cookie-file-removal software. These approaches, however, do not protect a user's identity; nor do they protect against malicious users intercepting data between the client and the server because these approaches may attempt to disinfect a user from intruders after the fact. Approaches in the past at protecting the user's identity have included allowing a user to connect to an intermediate server (sometimes referred to as a "proxy server") connected to the Internet that extracted off the user's IP information and substituted in its place the IP address of the intermediate server, thus creating an anonymous user that could then continue to surf the Net without worrying that his IP information would be used to identify him.

These past approaches do not protect a user's identity as soon as the user connects to the Internet because connected websites are able to read and identify the user's IP address among other things. A need therefore exists to protect the identity of the user immediately upon connecting to the Internet (i.e., known as "surfing the web" or "surfing the Net").

Thus there is a need for a privacy management approach that solves the problems recited above and allows Internet users to easily maintain their privacy.

SUMMARY

This application claims priority under Title 35, United States Code, Section 119(e), to U.S. Provisional Application Ser. No. 60/640,924 titled "System for Protecting Identity in a Network Environment," filed Dec. 31, 2004, which is incorporated herein, in its entirety, by this reference.

Systems consistent with embodiments of the present invention provide at least one network device each having at least one associated identifier. The network device may be capable, for example, of connecting over a network with a destination device. In an example of an embodiment, the system may include at least one masking server connected to the network device on a private side of the network. The masking server may receive a request to connect the network device and the destination server accessed on a public side of the network. The masking server may provide protection to a selected one of the at least one identifier by masking the identifier from the public network.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1A:
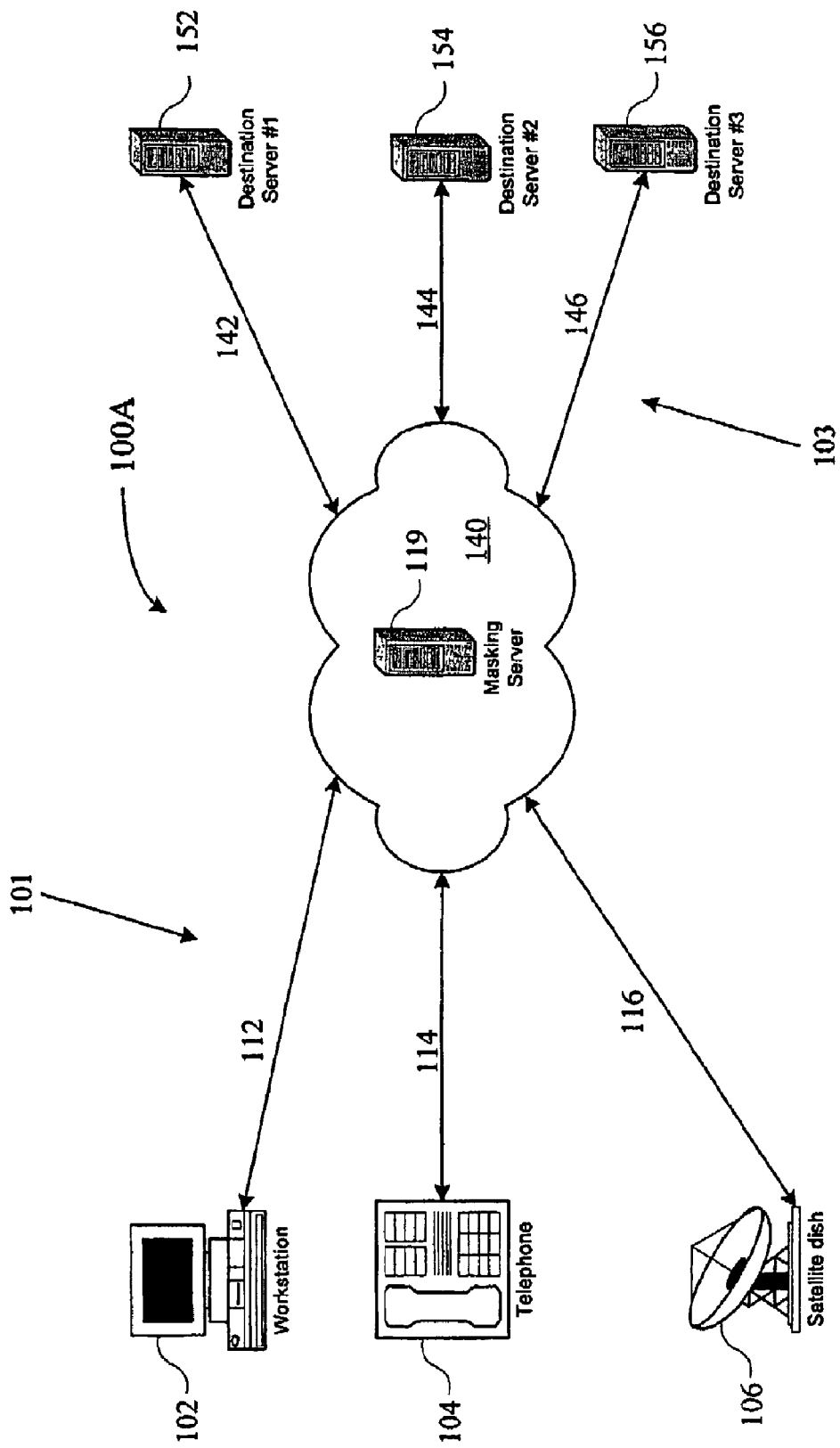
FIGS. 1A and 1B show block diagrams of the network elements of a system for protecting the identity in a network environment.

The following detailed description and figures describe example implementations of a system for protecting identity in a network environment. The components may include a network-level (TCP/IP) traffic interceptor (client side), a client Graphical User Interface ("GUI"), a local client proxy or a remote proxy server, and an apparatus, system, or process that can modify, mask, or obscure identifying information associated with a communication, or one or more characteristics of the communication. Identifying information may include or specify the population or possible origination of the communication. Because implementations described in this specification are readily applicable to the Internet, the Internet is used for illustrative purposes only and different implementations may apply to any other network that relies on identifiers to transmit and receive messages. In the case of the Internet, the identifier may be an IP address. Other networks environments in which the present invention can be used include other computer-to-computer networks, as well as telephone, facsimile, voice over IP (VOIP), paging, or any other system where the nature of communication imparts identifying information about the origination or originator of a communication. References in this specification to specific protocols should not be deemed to limit this invention since it is capable of implementation using any network protocol and any encryption method or protocol. In addition, connections, as used in this specification, should be given their broadest meaning, including without limitation, wired or wireless connections, intranet connections, internet connections, local area network connections, wide area network connections, and any combination thereof.

Reference is made in this specification to clients and servers. In general, client/server computing is a computational architecture that involves client processes requesting service from server processes and is a logical extension of modular programming. With this architecture, the calling device or system becomes the client (that which requests a service), and the called device or system becomes the server (that which provides the service). The final recipient of the request for service is sometimes referred to as the destination. The logical extension of this is to have clients and servers running on the appropriate hardware and software platforms for their functions. Additionally, any hardware or software device may at times serve as either a client or a server, or both. It will be understood that use of client and server is not meant to be limiting and that any permutation of client/server may be implemented or used, and, in some cases, there may be multiple clients and/or multiple servers involved in the process.

Reference is also often made to cookies. Many other information-transfer techniques may be used in place of cookies, including HTML headers, changes to URLs or other addresses, and any other standard or custom message or data structure. Reference is also made to XML data structures. However, for example, XML structures can be replaced with other types of data structures, including other standard and non-standard, encrypted and non-encrypted structures. It will be understood, however, that use of "cookies" and other terminology related to information transfer techniques and data structures is not intended to be limiting and that any kind of identifying information can be used in accordance with the invention.

Figure 1B:
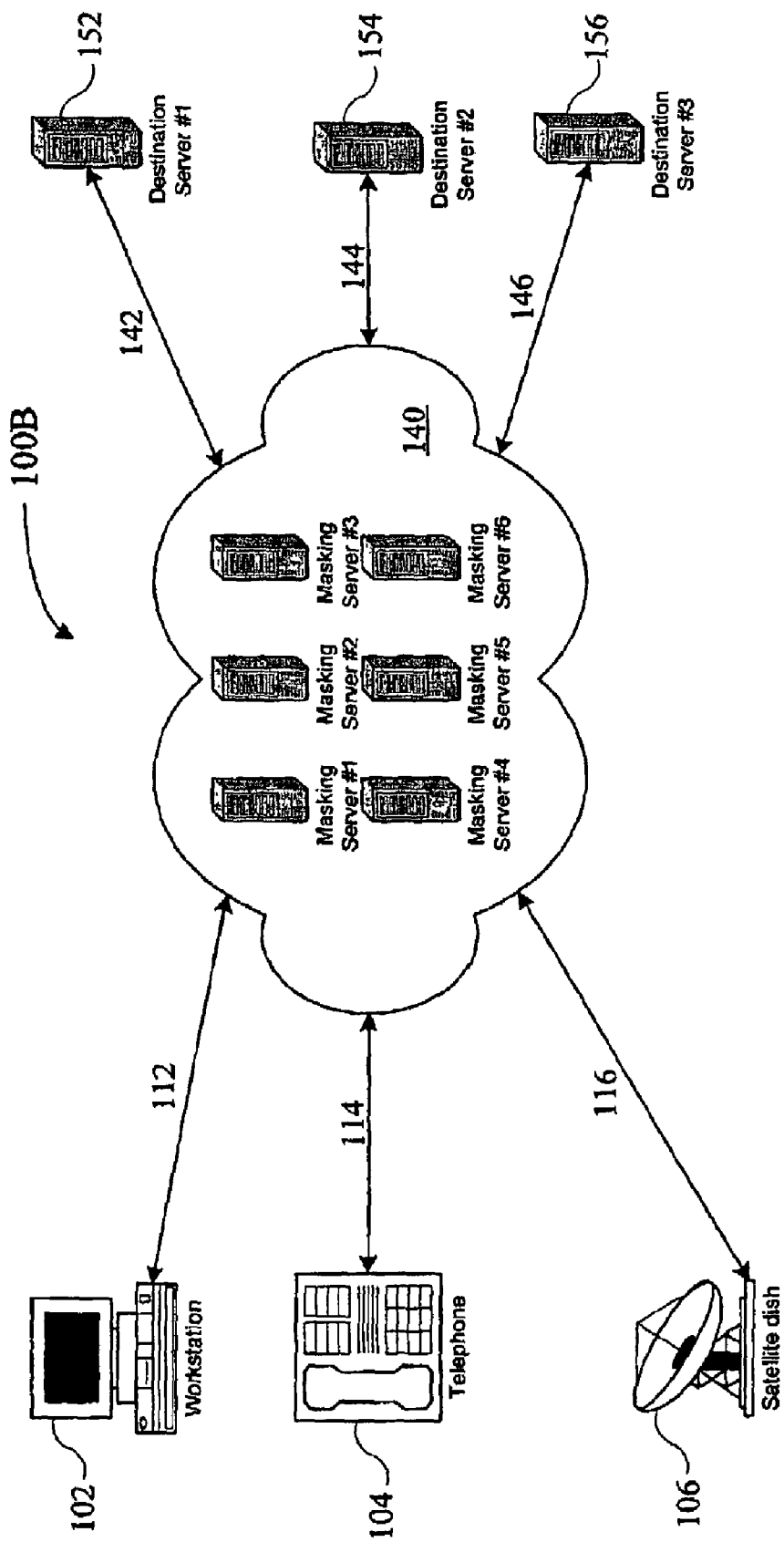

FIGS. 1A and 1B show block diagrams of basic components of two example implementations of systems 100A and 100B, respectively, for protecting identifying information in a network environment. In FIG. 1A, workstation 102, telephone 104, and satellite dish 106 connect to a network or an internet 140 via communication paths 112, 114, and 116, respectively. System 100A is applicable to any type of type of network; however, the example of FIG. 1A shows data transmission, Voice over Internet Protocol ("VoIP"), and satellite transmission. In general, the client, e.g., workstation 102, telephone 104, or satellite dish 106, may initiate a conversation with a server, in this case, a processing apparatus 119, which may be a server, labeled for convenience a masking server in the figure. The remainder of this description will refer to apparatus 119 as the masking server.

Paths 112, 114, 116 are communications paths over which clients (workstation 102, telephone 104, or satellite dish 106) may communicate in the example shown in FIG. 1A, which shows a network interface of the masking server 119. The network interface may be any type of suitable interface that provides the masking server 119 with access to the clients. The same or a different network interface may provide the masking server 119 with access to destination servers 152, 154, 156. The masking server 119 may divide the entities it communicates with on the network into entities on a private side 101 and a public side 103. Reference to private side and public side is illustrative only and not intended to be limiting. Nor does the reference to a "private side" and a "public side" imply any physical division of the network by the masking server 119.

The private side 101 includes network devices that connect to the masking server 119 during a connection to a destination server 152, 154, or 156. The private side 101 is only private in that the identity of the network devices is protected from access to entities that communicate on the public side 103. One of ordinary skill in the art will appreciate that no limitation as to network configuration is implied by the division of the network into the private side 101 and the public side 103. For example, the network devices and destination servers may all be communicating openly on the Internet, or some other public network and the network devices would be on the private side because its identity is being protected by the masking server as it connects with a destination server. Similarly, the network devices may be provided with access to the masking server 119 using a Virtual Private Network, or some other private connection. In addition, a variety of schemes may be used to provide the network interface to the masking server.

Additionally, the communication need not be initiated from devices on the private side 101 but may be initiated by devices on the public side 103. Using the Internet as an example network, a computer on the public side 103 might wish to connect to a server running on the private side 101 using a masked IP address provided by the masking server 119. The device on the public side would be able to initiate a communication with a device on the private side without necessarily knowing the identity or location or real address of that device.

As shown in FIG. 1A, the client may initiate the connection to the masking server 119 with its identifying information. The masking server 119 protects the identifying information of the client or clients by masking, hiding, obscuring, or modifying its identifying information, In one example of application of the masking server 119 in a network a client's identifier is replaced with a masking identifier. In the case of networks that use the Internet, the masking server 119 replaces the client's IP address with a substitute (masking) IP address. The substitute IP address could be randomly selected, sequentially selected, individually assigned, or chosen using any other suitable mechanism or process for selecting. In the case of the Internet, the identifying information may also include: cookies, language preference, character set preference, time zone, email address, chat account name, operating system, operating system version, browser version, software name, software version, user names, user addresses, Universal Resource Locators (URLs), among others. In different types of networks, the identifiers and masking identifiers may also be telephone numbers or device names.

When masking IP addresses, the protected IP address is masked by the masking IP address, which becomes visible to the destination servers. There are several options for performing the masking of the protected IP address. For example, options include allocating:
 a single IP address to some or all users of the system;
 many IP addresses for simultaneous use by some or all users in common,
 one or more IP addresses for use by each user.

These IP addresses may come from many different sources and/or exist within many different blocks of IP addresses. Some IP addresses may be reserved for use by only some of the users of the masking server 119, while others may need to be excluded from use by the masking server 119. A system for managing the IP addresses may be employed to ensure that IP addresses are allocated correctly. Additionally, the system may control the frequency of re-allocation of IP addresses. The systems may keep track of which IP addresses have been assigned to which users, or it may track utilization without reference to the specific user to whom the IP address was allocated. The systems may base tracking of IP address on, for example:
 the destination of the communication,
 the time the IP address was last used by anyone,
 the last time the IP address was used by a specific user,
 a selected time before which it can not be assigned at all,
 a selected time before which it can not be assigned to a specific user or users.

Many other ways of tracking IP addresses are available as well. In general, the same methods and considerations discussed above for IP addresses would apply to the allocation and management of any other identifiers whether or not on the Internet.

Masking identifiers may be created ad-hoc by the user, or selected from a list of available possible identifiers for each type of identifier (such list may also be extensible by the user or other means). The identifiers may be stored for re-use, and may be associated with specific destinations, applications, protocols, or otherwise tagged for easy retrieval and or re-use. Allocation of the identifiers may be completely automated or partially or fully manual. Such allocation may be controlled through an API or through a command line or GUI interface. Such allocation may be controlled by the user, the user's computer, a communications apparatus, an administration device, or by any other local or remote mechanism.

The masking server 119 completes the client/server process by transmitting the newly protected transmissions to the intended destinations, Destination Server #1, Destination Server #2, and Destination Server #3. Transmissions returned by the final destinations are received by the masking server 119 and "de-masked" and returned to the appropriate client.

FIG. 1B shows a block diagram of a system 100B similar to that of FIG. 1A, with the exception that this system is multiplexed, i.e., it has multiple masking servers 119 that may be geographically disbursed, and the transmissions from the clients may be masked by transmission through one or more of these masking servers 119. The system 100B may also periodically change the masking server transmitting to a final destination, and/or rotate identifiers used to mask a client's identifier within a single masking server, thereby making the transmission to the final destination seemingly widely dispersed and thus immune to Internet Counter-Intelligence techniques. The masking servers 119 may also be run in parallel, with some of the masking servers 119 being virtual servers. A management system may also be implemented to manage allocation of the identifiers across the multiple masking servers 119, and to determine which identifiers may be allocated by each masking server or group of masking servers. In some cases the masking servers 119 may not be geographically or network topologically near each other. The management of identifiers may also need to ensure that users are allocated to the correct masking server for providing specific required identifiers that may be available only from certain masking servers 119.

Figure 1C:
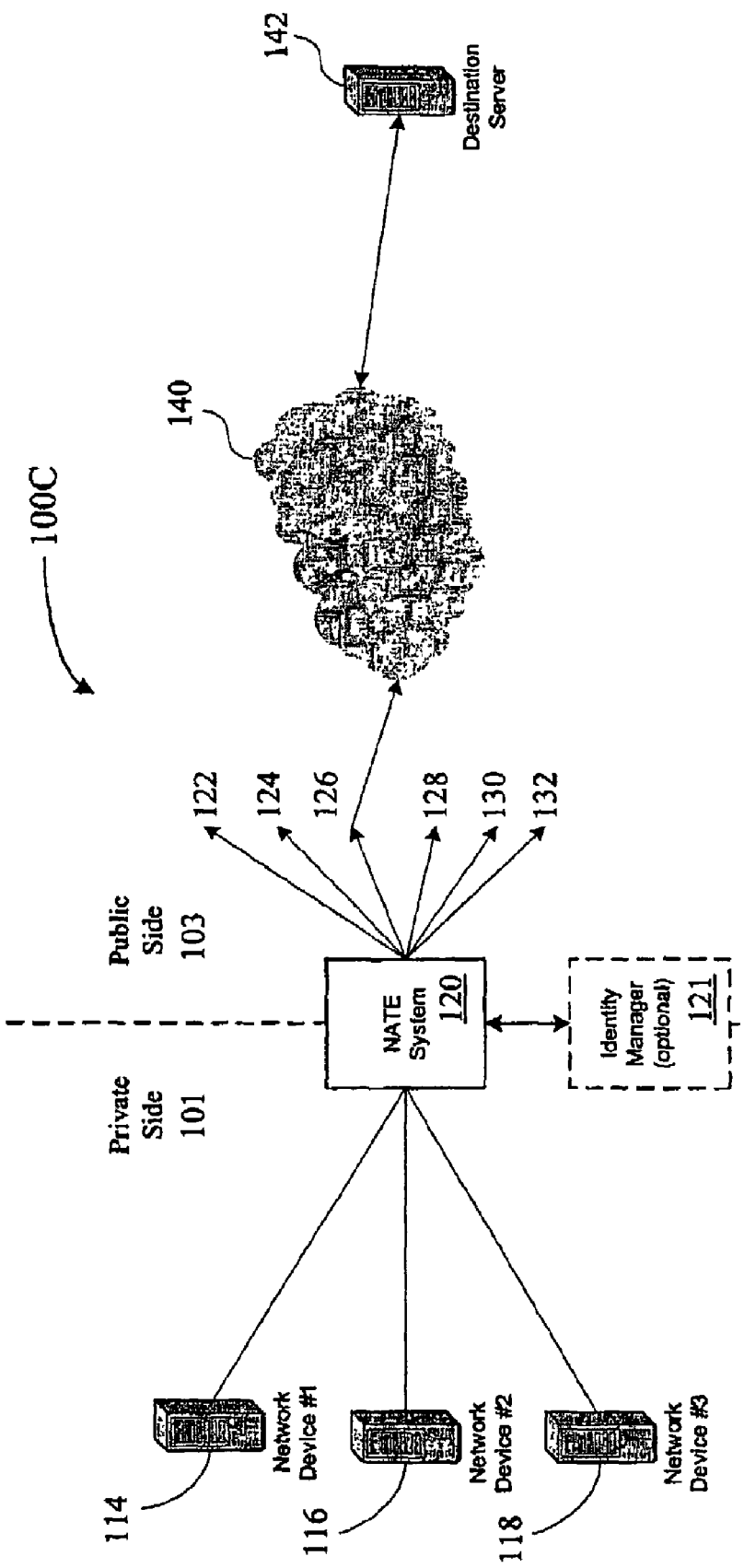
FIG. 1C shows a block diagram of the network elements of another system for protecting identities in a network environment using an example of a NATE (Network Address Translation Exploder) system.

FIG. 1C is another block diagram that shows a system 100C that implements a Network Address Translation Exploder ("NATE") 120 as its masking server. This block diagram shows the system 100C as having a Private Side 101 and a Public Side 103. The Private Side 101 refers to that portion of the system 100C that is accessible and visible only to the users of the system 100C. The Public Side 103 refers to that portion of the system 100C that is accessible and visible only to the outside world at large, i.e., the Internet or any other connected network. A function of the system 100C is to maintain a separation between the Private Side 101 and the Public Side 103. On the Private side 101, accurate identifiers of the users may be visible to anyone with access to the communication. On the Public Side 103, any identifiers being masked might not correspond to the accurate identifier for that user. As one example implementation, the system 100C might mask IP addresses by changing users' real IP addresses, which are visible on the Private Side 101, to new IP addresses that are assigned by the system 100C and visible on the Public Side 103.

FIG. 1C shows Network Device #1 114, Network Device #2 116, and Network Device #3 118, all of which are in signal communication with the NATE 120 from the Private Side 101. FIG. 1C shows the three (3) network devices for illustrative purposes; it is appreciated by those of ordinary skill in the art that these network devices may be PC's, workstations, servers, peripherals, PDA's, gaming desktops, Internet-enabled cell phones and any other devices capable of being connected to or communicating with a network, and that the number of network devices in signal communication with the NATE 120 is limited only by the capacity and scalability of the NATE 120.

The NATE 120 may allow one or more network devices to appear as many different devices. It is appreciated by those of ordinary skill in the art that a network device within the Private side 101 may have an IP address assigned to it by Network Address Translation ("NAT"), which employs a method of connecting multiple network devices, e.g., a Local Area Network ("LAN"), to the Internet or any other IP network using only a single, unique IP address to represent the entire group of network devices. In the system 100C, multiple users may connect to the NATE 120, which translates the incoming IP addresses to new IP addresses that will be visible to the destination server, hence the term NATE—N A T Exploder. The following functions may be supported: Translation of the IP addresses for all users on the Private Side 101 to a single IP address on the Public Side 103, translation to many IP addresses assigned randomly or sequentially to the users, translation to a single IP address for each user, and translation to a different but potentially overlapping list of IP addresses for each user or group of users. It will be understood that NATE 120 may be located anywhere, for example, co-located with the client, co-located with the destination, or anywhere in between.

The IP addresses may be static, assigned for a period of time, changed on a periodic or random time basis, changed for every new communication/connection, or changed by the user either to randomly selected new IP addresses or to addresses of the user's choosing. In some applications, the NATE may assign a new IP address or other identifier with high frequency, including assigning a new address for each new connection, to ensure the hiding of high volume and high intensity communications. One example of such an application is an information gathering system that may be used to gather information and maintain the source of the requests for information private. In some implementations, a set of identifiers such as IP addresses may be actively configured on the NATE and assigned to connections from the set of identifiers actively configured. That set of configured identifiers may then be changed in part or whole for another set on demand, periodically, randomly, or in some other manner. The user may also keep track of IP addresses that have been used for each Destination so they can be reused consistently with that Destination so as to appear to be the same user on each visit. While the above is described in terms of IP addresses, it is appreciated by those of ordinary skill in the art that this may be applied and extended to any other identifier on any network, not just the Internet.

In general, the NATE 120 may maintain a pool of available IP addresses, may randomly or sequentially select an address from the pool and assign it to an incoming Internet connection, may change the IP address for each incoming Internet connection, may periodically change the IP address assigned to a particular Internet connection, and/or may also accept parameters from the connecting network device so that it may specify certain characteristics of its selected IP address. Moreover, it is also appreciated by those of ordinary skill in the art that the system 100C may comprise multiple NATEs 120, each of which may maintain its own pool of IP addresses.

In the example shown in FIG. 1C, communication paths 122, 124 and 126 are outgoing connections from the NATE 120 to the Internet, each with a unique IP address selected by the NATE 120, corresponding to Network Device #1 114, Network Device #2 114, and Network Device #3 116, respectively. Communication paths 128, 130 and 132 are outgoing Internet connections corresponding to other network devices (not shown) in the Private side 101. FIG. 1C shows communication path 126 connected to the Internet 140, which in turn establishes the Internet connection with the destination server 142. Once this communication path is established from the Network Device #3 118, only the IP address selected by the NATE 120 will be visible to the destination server 142.

FIG. 1C also shows an optional Identity Manager 121 in signal communication with the NATE 120. The Identity Manager 121 may manage, enable, or coordinate the allocation of masking identifiers to the various users or Network Devices 114, 116, 118. The Identity Manager 121 may work remotely with NATE 120, or may be incorporated into the NATE 120.

Figure 1D:
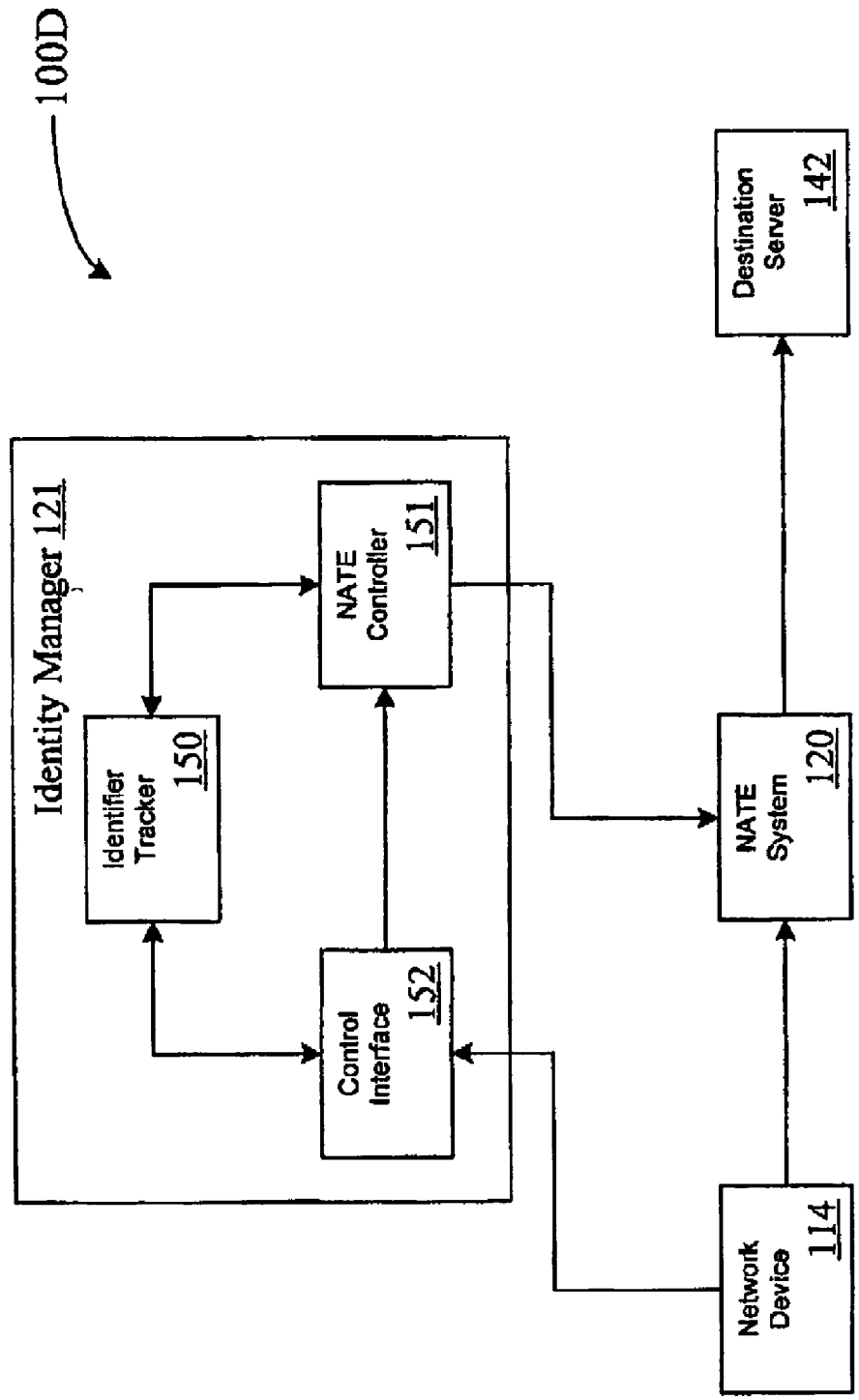
FIG. 1D shows a block diagram of an example implementation of an identity manager that is shown in FIG. 1C.

FIG. 1D shows a block diagram of an example implementation of an Identity Manager 121. In this example, the Identity Manager may be composed of three elements: Identity Tracker 150, Control Interface 152, and NATE Controller 151. A Control Interface 152 provides a mechanism for the user, Network Device 114, or some other person or apparatus to control allocation of identifiers to communications passing through a NATE 120 to a Destination Server 142 or other recipient of a communication, A Control Interface 152 may provide a physical, GUI, API, or other interface for controlling allocation of identifiers to communications through a NATE 120. This interface may provide for storing and retrieving identifiers or groups of identifiers. These identifiers or groups of identifiers may be associated with specific users or Network Devices 114, and/or Destination Servers 142.

A Control Interface may work through a NATE Controller 151 to communicate desired identifier allocations to the NATE 120. This NATE Controller 151 may be able to control numerous types of NATE Systems 120 and may be distinct and remote from the Control Interface 152 and other elements of the Identity Manager 121. A NATE Controller 151 may be also incorporated into a NATE 120.

An Identifier Tracker 150 may also be part of an Identity Manager 121. An Identifier Tracker 150 may provide capabilities to a Control Interface 152 and/or a NATE Controller 151. An Identifier Tracker 150 may store information such as which identifiers are currently or have previously been allocated, to what users or Network Devices 114 the identifiers have been allocated, and/or for which Destination Servers 142 the identifiers were used. Additionally, an Identifier Tracker 150 may store information about identifiers that may be limited resources, such that they may only be allocated to a single user, Network Device 114, or communication at a time, or that may only be allocated a certain number of times in a given time period, or that may only be (or may not be) allocated to a specific user, Network Device 114, communication, Destination Server 142, or any combination or permutation thereof. The Identification Tracker may singly, or in combination with the Control Interface 152, NATE Controller 151, or NATE System 120 enforce restrictions on the use and allocation of identifiers.

Figure 2:
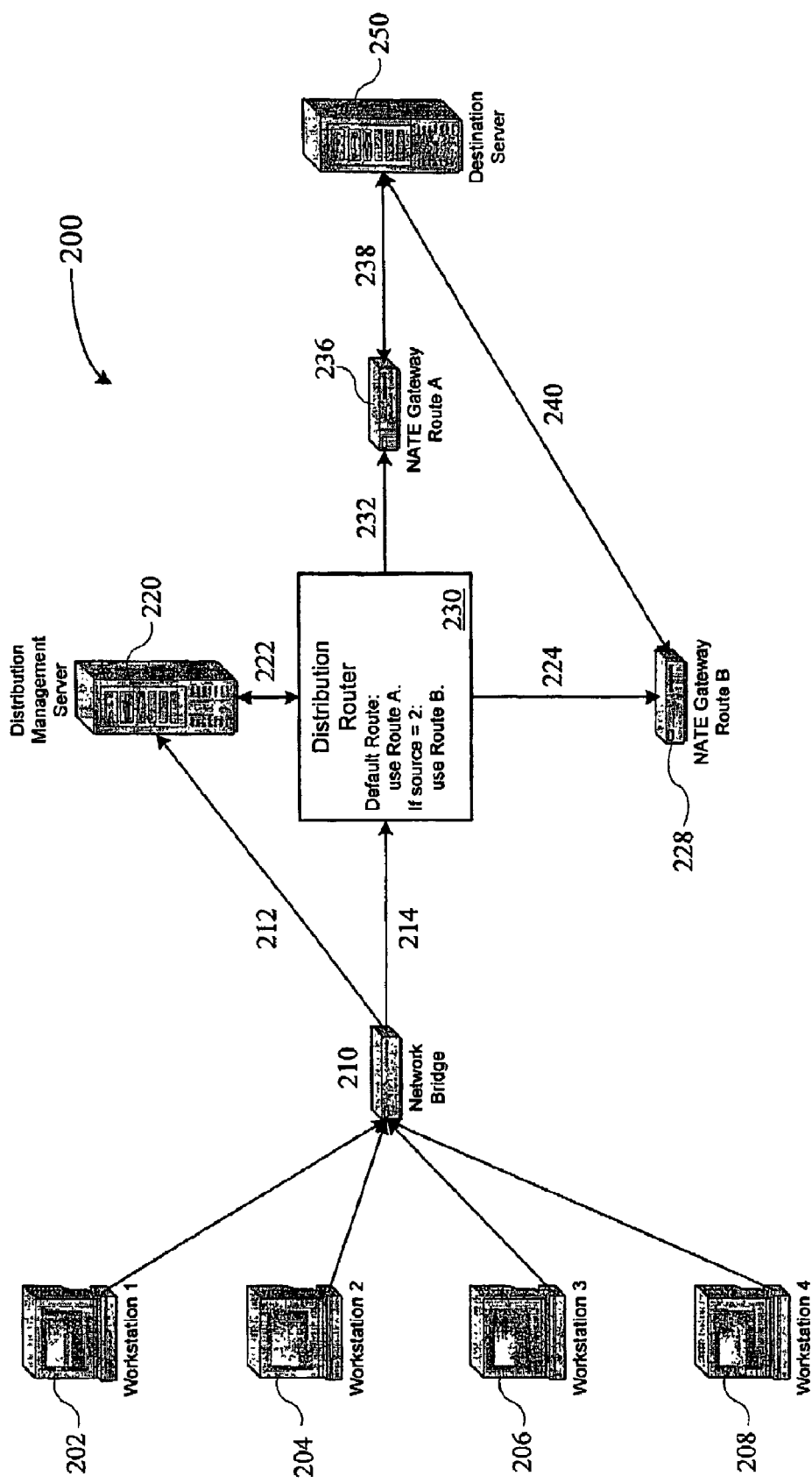
FIG. 2 shows a block diagram of an example implementation of the system of FIG. 1C.

FIG. 2 shows a block diagram of an example implementation of a network within the Private side 1011. In this example of an implementation, multiple network devices, Workstation 1 202, Workstation 2 204, Workstation 3 206 and Workstation 4 208 are connected to Network Bridge 210. Workstation refers to a device or apparatus that is having some of its identifiers masked; it may be a computer, network of computers, phone, handheld computer, game, fax, or any other apparatus or system capable of communicating through a communications network. Network Bridge 210 may also be connected to other LANs using the same protocol, e.g., Ethernet or Token Ring, and other network devices (not shown) may also be connected to Network Bridge 210.

Although FIG. 2 shows single workstations, the Network Bridge 210 may also be connected to many different networks having network devices that may have their identity protected by connecting to the destination server as shown in FIG. 2. The network bridge 210 advantageously provides a route to an enterprise that may contract with users and other enterprises to provide identity protection services. In such an implementation, the network devices would be configured to connect to the network bridge whenever an access to a destination server is requested. The network bridge may then route the connection to the distribution router 230, which may be under the control of the enterprise that provides identity protection services.

In FIG. 2, workstations may initially use the default path through NATE Gateway (Route A) 236, via communication paths 214 and 232. NATE Gateway (Route A) 236 may supply a network (e.g., internet) connection 238 to Destination Server 250. Workstation 2 204 may then elect to have its network connection through NATE Gateway (Route B) 228. The presence of the default path is not a necessary part of this invention; in some implementations there may be no default, only the one or more Gateways B. Workstation 2 204 does this by connecting via communication path 212 with Distribution Management Server 220, which may be a Web server that may require the user to log on or any other Application Program Interface ("API") that will allow the user to interface with the Distribution Management Server 220. Workstation 2 204 may select from the available gateways, in this example, choosing Gateway B. Gateway B may be geographically remote from the distribution server to enable a user to appear to be located in various different physical locations. Gateway B may be connected to a different network, or may be topologically distant part of the network from the distribution server or default gateway enabling a user to appear to be using various different networks, network providers, or access paths.

The Distribution Router 230, using source-based routing, may be used to direct traffic to the appropriate gateway, in this case, NATE Gateway (Route A) 236 or NATE Gateway (Route B) 228. The Distribution Router 230 may obtain routing rules from the Distribution Management Server 220 via communication path 222, and may create a new rule in the Distribution Router 230, directing traffic sourced from Workstation 2 204 to go through NATE Gateway (Route B) 228. The Distribution Router 230 may then direct the traffic from Workstation 2 204 to NATE Gateway (Route B) 228. The NATE Gateway (Route B) 228 may contain a NATE 120 (shown in FIG. 1C), which can be used to assign an IP address from its own pool of IP addresses to the Workstation 2 204 traffic. NATE Gateway (Route B) 228 may in turn establish an Internet connection with the destination server 250 via communication path 240. If the Network Bridge 210 utilizes Network Address Translation ("NAT"), then the Distribution Router 230 will be able to set an IP address for network devices behind that NAT and the network bridge.

Figure 3:
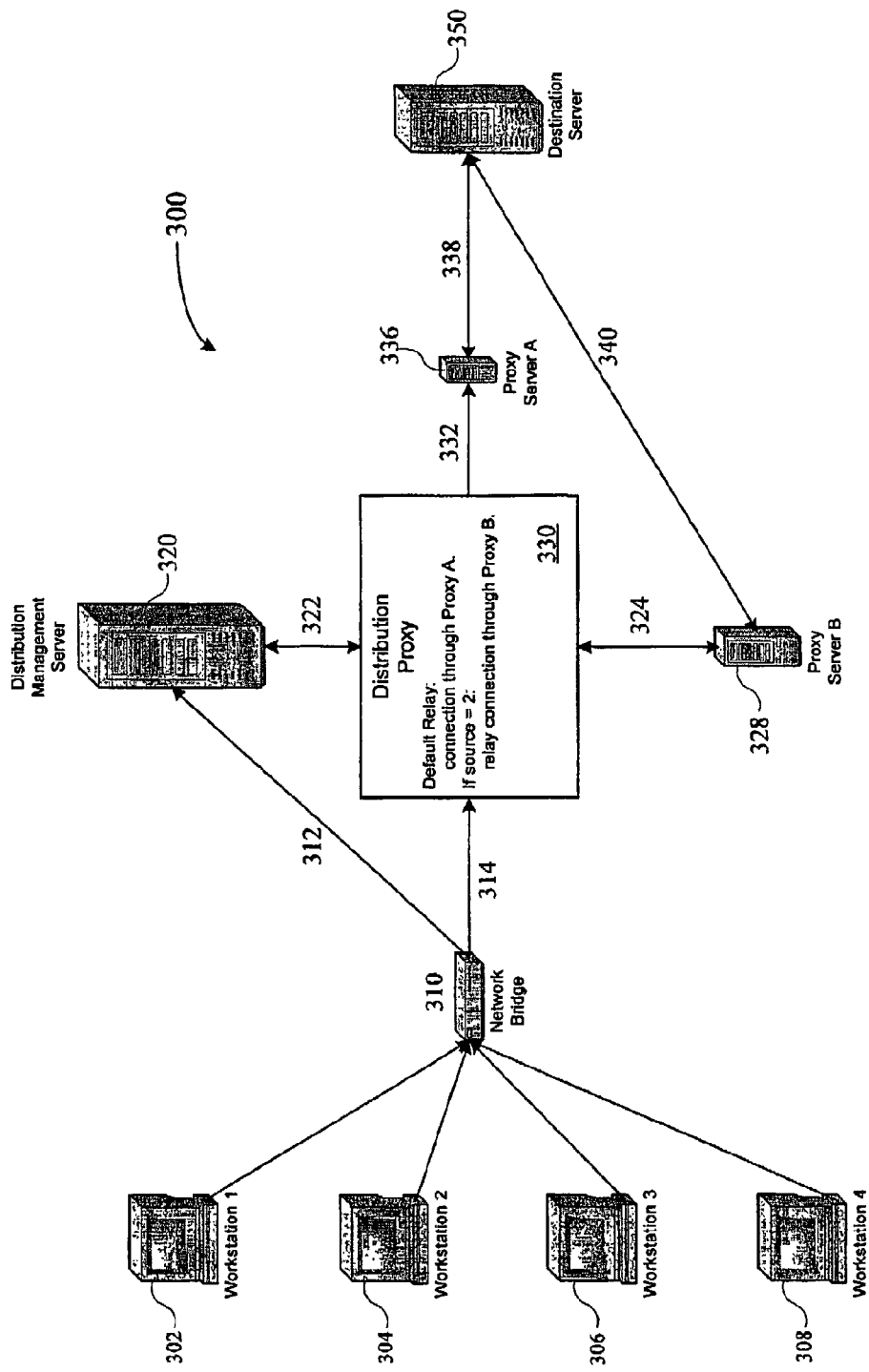
FIG. 3 shows a block diagram of another example implementation of the system of FIG. 1C.

FIG. 3 is another block diagram of an example implementation of a single user's network within the Private side 101 (shown in FIG. 1C) that may utilize a Distribution Proxy 330 in lieu of the Distribution Router 230 of FIG. 2. As in FIG. 2, in the exemplary implementation of FIG. 3, a single user's multiple network devices, Workstation 1 302, Workstation 2 304, Workstation 3 306 and Workstation 4 308 may be connected to Network Bridge 310, and all workstations may initially use the default relay connection through Proxy Server A 336, via communication paths 314 and 332. Proxy Server A 336 may supply the Internet connection 338 to Destination Server 350. These Proxy Servers may operate at the network, protocol, or at any other level and may or may not be visible to the users.

Workstation 2 304 may elect to have its network connection through a gateway in the form of Proxy Server B 338. Workstation 2 304 may do this by connecting to the Distribution Proxy 330, and selecting from the available gateways, in this example, choosing Proxy Server B 328. Selection of a gateway may be by means of a local client that inserts a header specifying the gateway to use, or by means of receipt of cookies from the Distribution Proxy 330, or by means of a Web page that maps the Workstation 2 304 IP address to the gateway preference, or by means of any other like data transfer mechanism.

The Distribution Proxy 330 may then use a proxy relay to send all of the traffic from Workstation 2 304 to Proxy Server B 328. A NATE System 120, like that shown in FIG. 1C, associated with Proxy Server B 328, may be used to assign an IP address from its own pool of IP addresses to the Workstation 2 304 traffic. Proxy Server B 328 may in turn establish the network connection with the destination server 350 via communication path 340. If the Network Bridge 310 utilizes Network Address Translation ("NAT"), then the Distribution Proxy 330 will be able to set an IP address for network devices behind that NAT and the network bridge 310.

Proxy Server A 336 and Proxy Server B 328 may be at a remote location, or may be a connection to a proxy at a remote location and maintained by a different provider. The connections between proxies could be physical, wireless, inter-networked, or by means of a Virtual Private Network ("VPN"), or any other type of virtual connection, direct or indirect network connection, or direct or indirect communication path. The Distribution Proxy 330 may obtain instructions or information regarding proxy relays from the Distribution Management Server 320 via communication path 322, and may create a new relay in the Distribution Proxy 330, directing traffic sourced from Workstation 2 304 to go through proxy server B 328.

Figure 4:
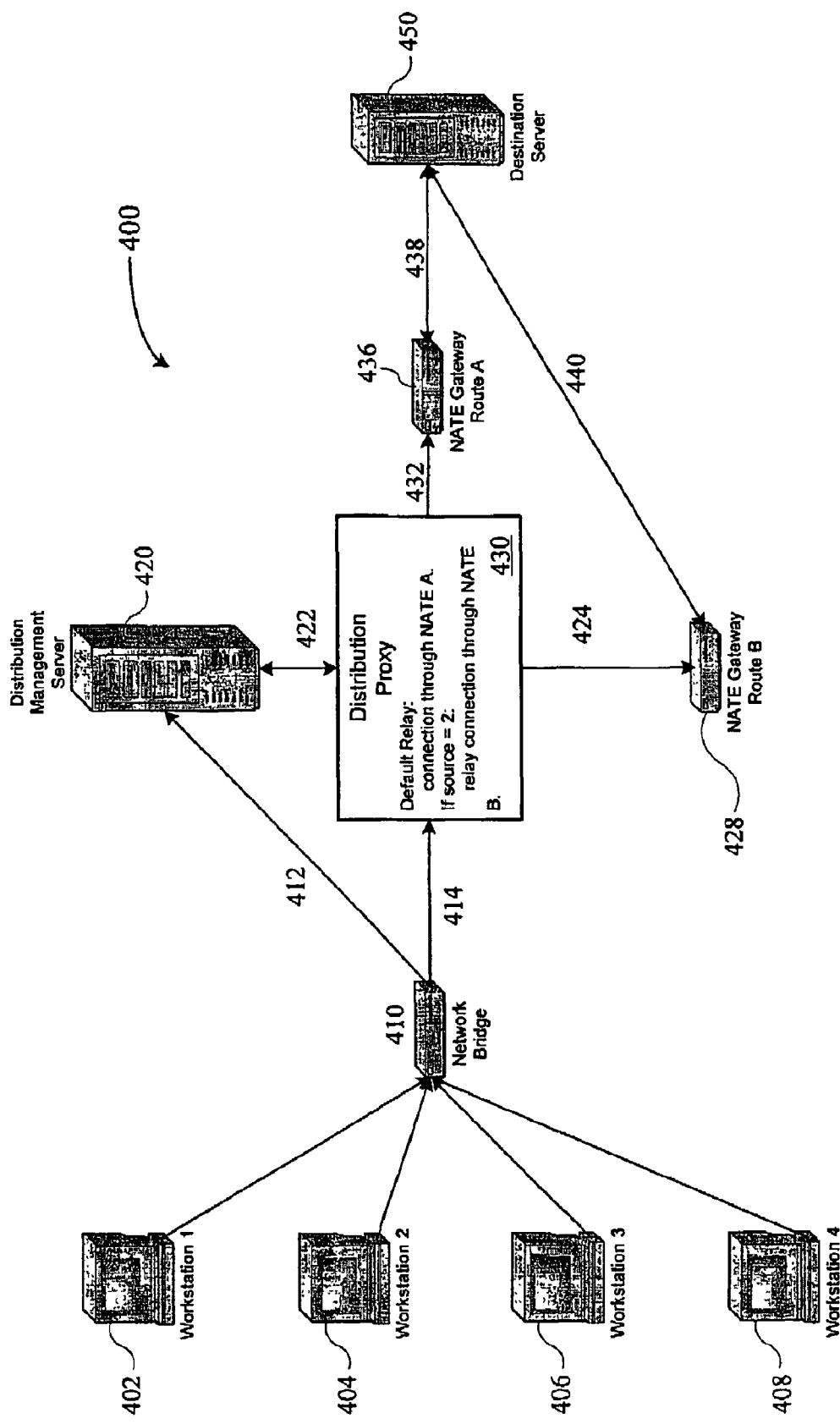
FIG. 4 shows a block diagram of yet another example implementation of the system of FIG. 1C.

FIG. 4 is another block diagram of an example implementation of a single user's network within the Private side 101 shown in FIG. 1C. As in FIGS. 2 and 3, in the exemplary implementation of FIG. 4, a single user's multiple network devices, Workstation 1 402, Workstation 2 404, Workstation 3 406 and Workstation 4 408, may be connected to Network Bridge 410, and all workstations may initially use the default relay connection through NATE Gateway Route A 436, via communication paths 414 and 432. NATE Gateway Route A 436 may supply the network connection 438 to Destination Server 450.

Workstation 2 404 may elect to have its network connection through a gateway in the form of NATE Gateway Route B 428. Workstation 2 404 may do this by connecting to the Distribution Proxy 430, and selecting from the available gateways, in this example, choosing NATE Gateway Route B 428, Selection of a gateway may be by means of a local client that inserts a header specifying the gateway to use, or by means of receipt of cookies from the Distribution Proxy 430, or by means of a Web page that maps the Workstation 2 404 IP address to the gateway preference, or by means of any other like data transfer mechanism.

The Distribution Proxy 430 may then use source-based routing to send the traffic from Workstation 2 404 to NATE Gateway Route B 428. For example, the Distribution Proxy 430 can use a different outgoing IP address for each NATE Gateway and then use source based routing on the Distribution Proxy 430 or a router to send traffic from Workstation 2 404 to NATE Gateway Route B 428. NATE Gateway Route B 428 may then assign the appropriate IP address from its own pool of IP addresses to the Workstation 2 404 traffic. NATE Gateway Route B 428 may then establish the network connection with the destination server 450 via communication path 440. If the Network Bridge 410 utilizes Network Address Translation ("NAT"), then the Distribution Router 430 will be able to set an IP address for network devices behind the Network Bridge 410. Gateway refers generally to any device connecting the system 100C to the Public Side, or connecting any two networks. Generally speaking, a Distribution Proxy and Distribution Router are examples of devices for directing network connection, which may be from a device such as Workstation 1 302, to a Destination Server 350, to pass through some specified intermediate network segments out of a number of possible network paths from a masking server 130 to a Destination Server 350. Network traffic may be directed down a particular network path by the use of routers with certain routing rules, proxies or chains of proxies, real or virtual switched or dedicated circuits, or any combination thereof. It will be clear to one skilled in the art that this invention can be extended to a wide variety of communications infrastructures, networks, and media and that usage of the terms gateway, distribution proxy, distribution router, workstation, and destination server are not intended to be limited but rather convenient labels to describe networking devices that are commonly used in computer networks and systems.

Figure 5:
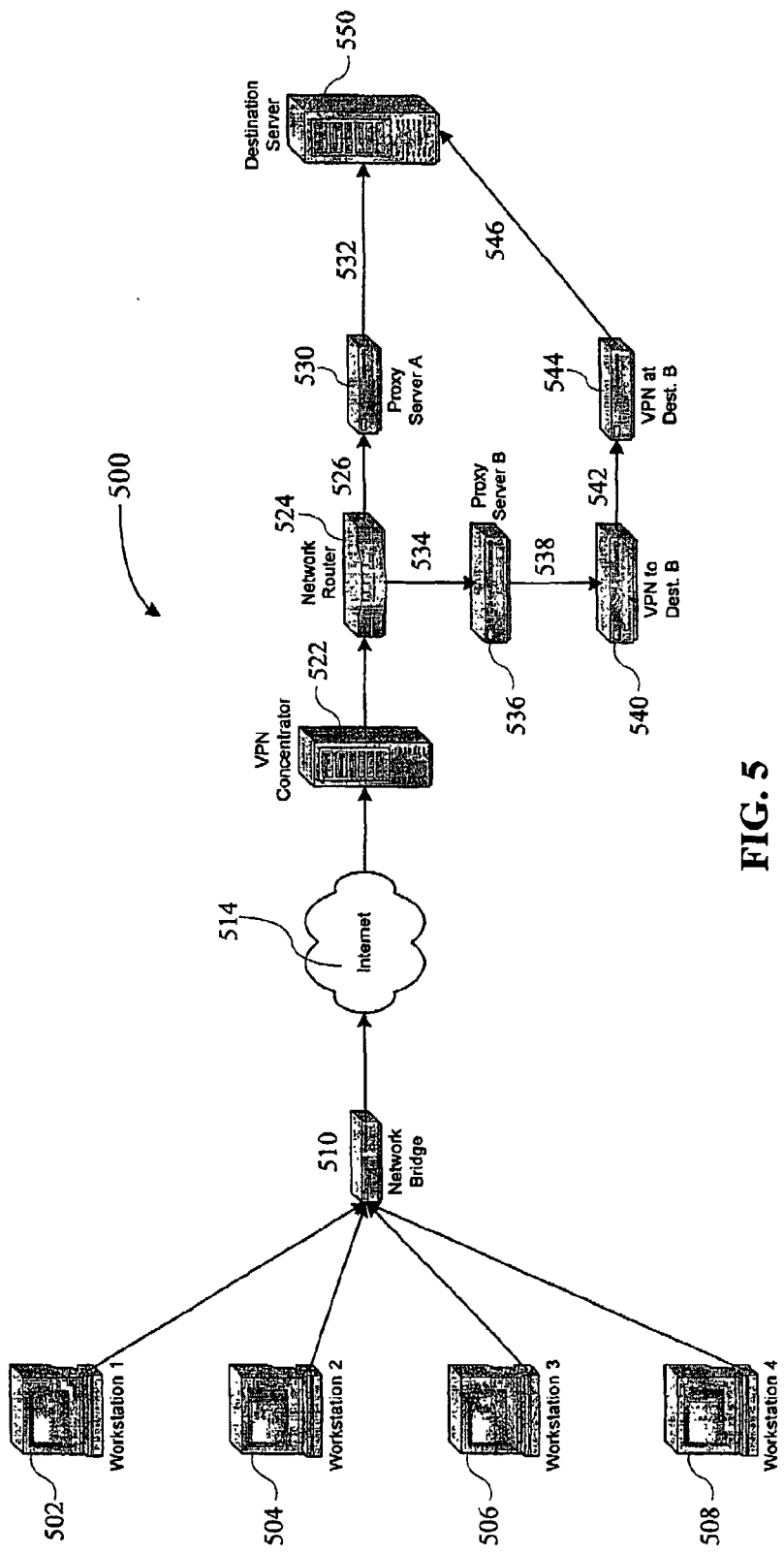
FIG. 5 shows a block diagram of another example implementation of the system of FIG. 1C.

Turning to FIG. 5, another block diagram of an example implementation of a single user's network within the Private side 101, FIG. 1C, is shown. As in FIGS. 2, 3 and 4, in this implementation a single user's multiple network devices, Workstation 1 502, Workstation 2 504, Workstation 3 506 and Workstation 4 508, may be connected to Network Bridge 510, and in this example implementation, the default path for all workstations may be a connection through the VPN Concentrator 522, the Network Router 524, and Proxy Server A 530. This example shows how VPNs can be used to secure and/or separate the components of the invention. This could also be done with dedicated, switched, packet, wireless, or other communication paths.

Workstation 2 504 may elect to have its network connection through a gateway in the form of Proxy Server B 536. Workstation 2 504 may select from the available gateways by using client software (an example of which is shown in FIG. 6), in this example, choosing Proxy Server B 536.

The Network Router 524, using source-based routing, may direct traffic to the appropriate gateway, in this case, Proxy Server B 536. The Network Router 524 may then direct the traffic from Workstation 2 504 to Proxy Server B 536. The Proxy Server B 536 may contain a NATE System 120, FIG. 1C (not shown), which may then assign an IP address from its own pool of IP addresses to the Workstation 2 504 traffic. Proxy Server B 536 may in turn establish an Internet connection with the destination server 550 via communication paths 538, 542 and 546.

Proxy Server A 530 and Proxy Server B 536 may be at a remote location, or may be a connection to a proxy at a remote location and maintained by a different provider. The connections between proxies could be physical, or by means of a Virtual Private Network ("VPN"), or any other type of virtual connection. In FIG. 5, the proxies are not located in the main network, as the Network Bridge 510 connects to the VPN Concentrator 522 via the Internet 514, creating a VPN. Also, Proxy Server B 536 connects to another VPN, VPN to Dest.B 540, which in turn connects to VPN at Dest. B 544, both of which may also be at remote locations. By having the Proxy Server B 536 in a remote location some identifiers indicating a user's geographical location may be masked.

Figure 6:
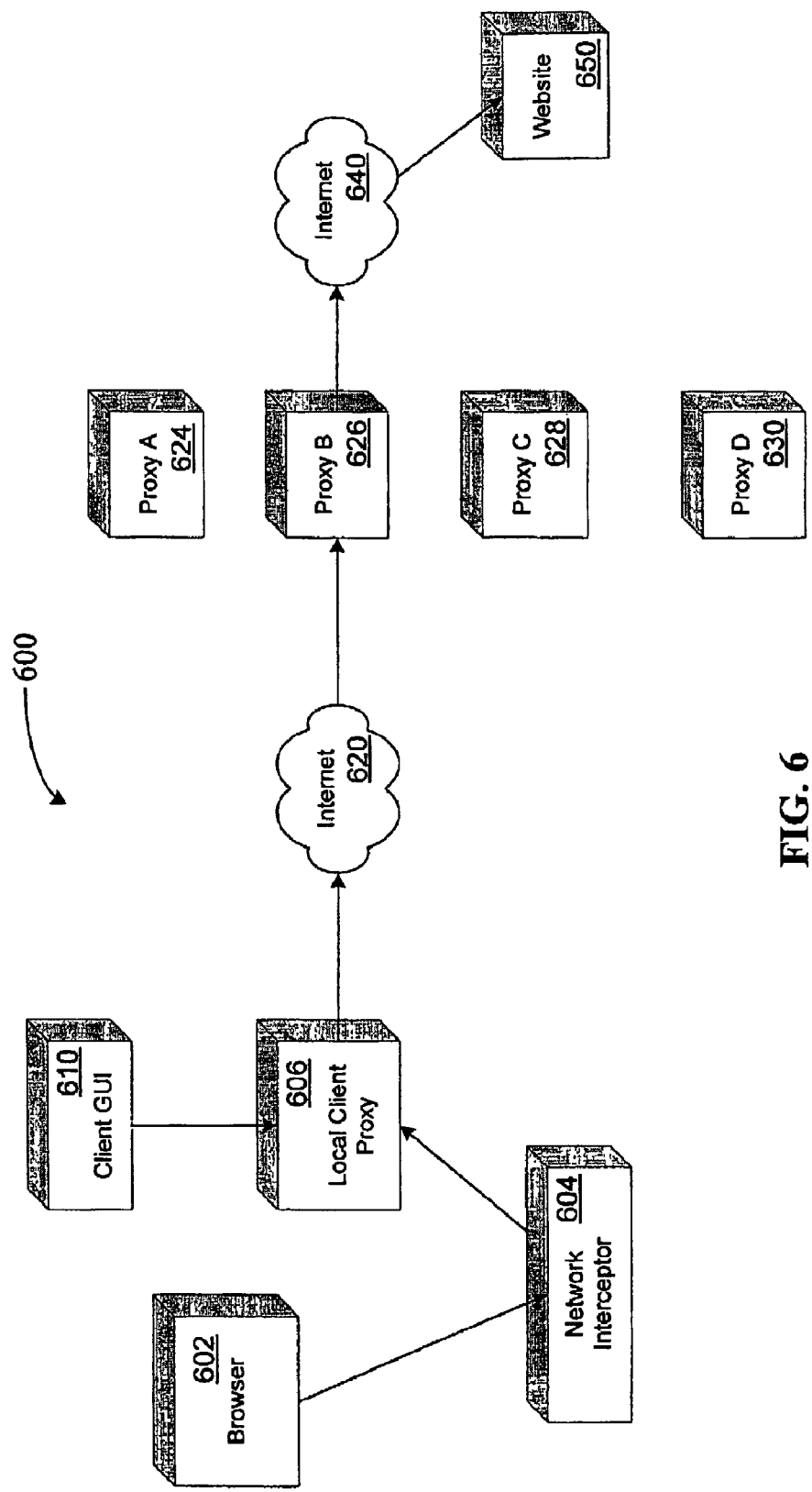
FIG. 6 shows a block diagram of example implementation of a user's interface with the system of FIG. 5.

Turning to FIG. 6, a block diagram of the basic components of an example implementation of the user's portion within the Private side 101, FIG. 1C, is shown. In this implementation, a user may use a network device (not shown) to establish a connection to the desired Website 650; for example, a user using a PC connects to the Internet 640 in order to retrieve data, such as Web pages on the Website 650. In this instance, the network device may be a PC, and the communication from the network device may be initiated by the browser 602 on the user's PC (not shown) and may be "intercepted" by a traffic interceptor 604, which may be software resident on the user's PC. The network interceptor 604 may then direct the communication to a local client proxy 606. Examples of various implementations of the network interceptor 604 and the local client proxy 606 are disclosed in U.S. Utility Application Serial No. PCT/US2004/020562 titled "Secure Network Privacy System," filed Jun. 25, 2004, which Application is assigned to the assignee of the present application and is hereby incorporated herein in its entirety by this reference.

The Client GUI 610 allows the user to specify which of the local client proxies it wishes to use, in this case, Proxy B 626. The local client proxy 606 makes a proxy connection via the Internet 620 to Proxy B 626, based on the user's preference implemented through the Client GUI 610. Proxy B 626 will in turn establish an Internet connection with the Website 650 via the Internet 640.

Proxy A 624, Proxy B 626, Proxy C 628, and Proxy D 630 may be remote proxy servers that are geographically dispersed, in which case, the connection at Website 650 will appear to be from that geographical location.

Figure 7:
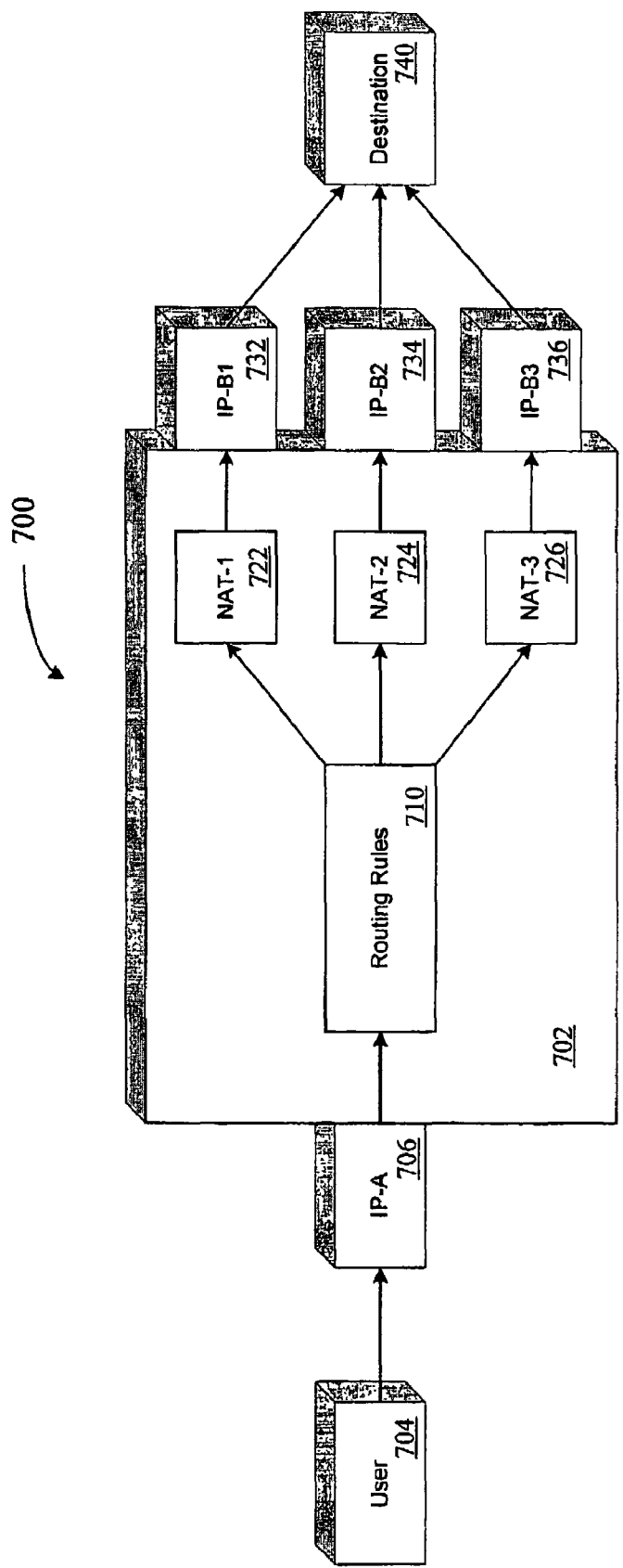
FIG. 7 shows a block diagram of example implementation of a NATE system of FIG. 1C.

FIG. 7 is an exemplary high-level block diagram 700 of the NATE System 120 shown in FIG. 1C. The outgoing network connection from a user 704 may reach the NATE System 702 on a static interface with IP address IP-A 706. Within the NATE System 702, each Internet session initiated by a user may be directed to a particular virtual Network Address Translator ("NAT"), in this example, NAT-1 722, NAT-2 724, and NAT-3 726. Each virtual NAT may have associated with it an outgoing IP address from within the NATE System 702, in this example, IP-B1 732, IP-B2 734, and IP-B 736. Association of an outgoing address with a virtual NAT may be made in accordance with Routing Rules 710, which may be modified by input from the user via a Client GUI 610, FIG. 6 (not shown). As with the NATE System 120, FIG. 1C, the pool of addresses available to the NATE System 702 may be of any size, may have IP addresses spread across many different address blocks and geographical areas, and may have IP addresses that are numbered non-consecutively.

Thus the block diagram FIG. 7 shows a single user with a single static IP address IP-A 706 simultaneously connected to Destination 740, showing three incoming IP addresses, IP-B1 732, IP-B2 734, and IP-B 736. At the same time, the NATE System 702 also may have the capability to change the outgoing IP addresses, either periodically or randomly, and either one at a time or all at once. The IP addresses may be based on fixed mapping from internal to external, with the mapping capable of being periodically changed, or random or consecutive selection of IP addresses from the list of interfaces available to the user.

The processes described in FIGS. 1 through 7 may be performed by hardware or software, and any combination thereof. If the process is performed by software, the software may reside in software memory (not shown) in the user's network device, the NATE system, a client proxy server or remote proxy server, or a removable memory medium. The software in memory may include an ordered listing of executable instructions for implementing logical functions (i.e., logic that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, device, or method, such as a computer-based system, processor-containing system, or other system that may selectively fetch the instructions from the instruction execution system, apparatus, device, or method, and execute the instructions. In the context of this document, a computer-readable medium and/or signal-bearing medium is any means that may contain, store, communicate, propagate, or transport the program for use by or in connection with the instruction execution system, apparatus, or device. The computer-readable medium may selectively be, for example but not limited to, an electronic, magnetic, optical, electromagnetic, infrared, or semiconductor system, apparatus, device, or propagation medium. More specific examples, i.e., a non-exhaustive list of the computer-readable media, would include the following: an electrical connection (electronic) having one or more wires, a portable computer diskette (magnetic), a random-access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In general, the example implementations described above may provide for a NAT exploder system that can be used to dynamically create IP addresses for each session on the Internet initiated by a user. An IP address may be generated for each user and a certificate authority public key may be automatically installed in the browser for SSL page rewriting, where the SSL page rewriting includes the client decrypting SSL pages to rewrite them before re-encrypting and sending to the proxy or the end website.

Other implementations may also provide for the client to insert information into data streams from browser to network through any kind of header or by inserting cookies. The cookies may include authentication/access rights information and preferences information and utilize XML and encryption. Generally the content of the communication may be modified as it passes in both directions, based on the identity of either party to the communication, the content of the communication, random selection, preferences by either users, or any combination of these.

Other implementations may also provide for gathering and generating Privacy Statistics that include per site privacy statistics, privacy analyzer real-time threat displays, and automated site threat analyses and ratings.

Other implementations may provide for an enterprise (or an individual) to gather information without divulging any information that would suggest the identity of the enterprise. A system for information gathering may establish connections to sites having the desired information through a privacy protecting system such as those described above with reference to FIGS. 2-5. The masking servers and NATEs running on those systems may be configured to assign and substitute masking identifiers at a high frequency in order to disguise high volume data retrieval. That is, the data from the target site would appear to be going to different users instead of all to the same user. In addition, many network devices may be used to retrieve information from a site, but share masking identifiers to appear as only a few network devices seeking the information.

Other implementations may also provide for setting per-site privacy settings that include white lists, black lists, detailed custom settings, "Show details" functionality, recommended site settings lists that include automatically updated and downloaded settings, and hard-coded site settings that cannot be changed by the user or that have preset defaults, and an exception list for selected sites. In a typical communication there are many aspects of the communication that are subject to modification, addition, or deletion. An interface may be provided for the specification of how these additions, modifications, or deletions should be made. This interface may be for human or machine use.

Other implementations may also provide for the substitution of personal information related to the user, such as real name, address, phone number, etc., with alternative information for purposes of identity protection, privacy, and tracking prevention. Such implementations may include the automatic substitution of real e-mail addresses, in intercepted communications, with alternative e-mail addresses for purposes of privacy and spam prevention. In addition to email addresses, other data that could be changed might include, but is not limited to, IP address, browser type, browser version, operating system type, operating system version, language preferences, character set preferences, time zone, software type, software version, device identifiers, device serial numbers, phone numbers, addresses, signature blocks, attachments.

Other implementations may also provide for the substitution of alternative or temporary credit card numbers for valid credit card numbers for purposes of enhanced authentication and security, fraud prevention and identity and privacy protection in e-commerce.

Other implementations may also provide for the client to keep a list of alternate access names/IP addresses for accessing servers. The client may try all addresses one after another and/or allow each user to get a different set of access addresses. This would enable the client to access the server even if some intermediary is trying to prevent or block the connection. These additional sets of information are not limited to name/IP address and may include any information characteristic of or contained in the communication.

Other implementations may also provide for installation on many computers while at the same time can detect and prevent multiple simultaneous users.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A system comprising:
    at least one network device having at least one identifier, the network device being on a private side of a network and capable of communicating with a destination device on a public side of a network;
    a plurality of masking devices for facilitating communications from the network device to the destination device, and configured to protect the at least one identifier from detection by the destination device by masking the identifier from the public side of the network, the identifiers of the at least one network device being protected by one or masking devices, wherein the masking devices operate in a coordinated manner,
    where the masking device protects the identifier of the network device by replacing the identifier on the private side of the network with a masking identifier on the public side of the network, and
    where the masking device further comprises a network address translation exploder ("NATE").

2. The system of claim 1 wherein the plurality of masking devices comprises a plurality of geographically disbursed masking devices.

3. The system of claim 1 where the masking device protecting the identifier of the network device changes to another masking device.

4. The system of claim 1 where the system further comprises a management apparatus for allocating the masking identifiers.

5. The system of claim 1 where the masking device is configured to associate one of a plurality of masking identifiers with a network device.

6. The system of claim 1 where the masking device is configured to associate one of a plurality of masking identifiers with each of a plurality of network devices.

7. The system of claim 1 where the masking device is configured to associate a single masking identifier with a plurality of network devices.

8. The system of claim 1 where the masking device associates a plurality of masking identifiers with a first network device and a plurality of masking identifiers with a second network device; where the plurality of masking identifiers of the first network device overlap with the plurality of masking identifiers of the second network device.

9. A system comprising:
    at least one network device having at least one identifier, the network device being on a private side of a network and capable of communicating with a destination device on a public side of a network;
    a plurality of masking devices for facilitating communications from the network device to the destination device, and configured to protect the at least one identifier from detection by the destination device by masking the identifier from the public side of the network, the identifiers of the at least one network device being protected by one or masking devices, wherein the masking devices operate in a coordinated manner,
    where the masking device protects the identifier of the network device by replacing the identifier on the private side of the network with a masking identifier on the public side of the network, and
    where the masking device further comprises a network address translation exploder ("NATE") for associating a single masking identifier with a plurality of network devices.

10. The system of claim 9 where the system further comprises:
    at least one NATE gateway, each having at least one masking device, where each masking device employs a NATE; and
    a distribution apparatus operable to direct connections from the network device to a selected NATE gateway, the selected NATE gateway using its NATE to protect the identifier of the network device.

11. The system of claim 10 wherein the distribution router comprises a NATE operable to provide a masking identifier.

12. The system of claim 11 wherein the distribution router directs connections based on at least one routing rule.

13. The system of claim 12 further comprising a distribution management server operable to create the routing rules and to provide the routing rules to the distribution router.

14. The system of claim 12 where the routing rule is provided in a request to connect from the network device.

15. The system of claim 9 further comprising:
    at least one proxy server having at least one of the masking servers that employs a NATE; and
    a distribution proxy operable to facilitate communication from the network device to a selected one of the at least one proxy server, the selected proxy server using its NATE to protect the identifier of the network device.

16. The system of claim 15 wherein the distribution proxy facilitates communications based on at least one proxy relay.

17. The system of claim 16 further comprising a distribution management server operable to provide proxy relays to the distribution proxy.

18. The system of claim 15 wherein the distribution router comprises a NATE operable to provide a masking identifier.

19. The system of claim 1 further comprising a network bridge on the private side of the network, where the network devices are configured to connect to the masking server on the private side of the network via the network bridge.

20. The system of claim 19 further comprising a plurality of networks each comprising a plurality of network devices, the network devices each configured to connect to the masking server on the private side of the network via the network bridge.

21. The system of claim 19 further comprising:
    a plurality of networks each comprising a plurality of network devices, the network devices each configured to connect to selected ones of the masking servers on the private side of the network via the network bridge.

22. A system comprising:
  at least one network device having at least one identifier, the network device being on a private side of a network and capable of communicating with a destination device on a public side of a network;
  a plurality of masking devices for facilitating communications from the network device to the destination device, and configured to protect the at least one identifier from detection by the destination device by masking the identifier from the public side of the network, the identifiers of the at least one network device being protected by one or masking devices, wherein the masking devices operate in a coordinated manner;
  a Virtual Private Network (VPN) concentrator connected to the network device, the VPN concentrator operable to direct a communication request from the network device to a network router, the network router operable to direct a communication to a destination server in accordance with a routing request from the network device; and
  a proxy server having a NATE, the proxy server being identified in the routing request and operable to provide a gateway for connecting to the destination server using a masking identifier provided by the NATE.

23. The system of claim 22 where the proxy server provides a second VPN connection to the destination server.

24. The system of claim 22 where the proxy server provides a second VPN connection to another network gateway.

25. A method of protecting identity comprising:
  requesting a connection between a network device and a destination server at a network routing device; and
  routing the connection via a gateway having a NATE server configured to operate a plurality of masking devices, wherein the masking devices operate in a coordinated manner, and operable to generate a masking identifier to protect an identifier of the network device.

26. The method of claim 25 further comprising:
  receiving a selected route from the network device, the selected route designating the gateway having the NATE server.

27. The method of claim 25 comprising:
  before the step of routing the connection via the selected NATE gateway, routing the connection using a default route via a default NATE gateway.

28. The method of claim 26 further comprising receiving the selected route from a distribution management server in a routing rule.

29. The method of claim 26 further comprising receiving the selected route as a proxy relay.

30. A method for providing identity protection to a plurality of networks comprising:
  providing a plurality of network devices in the plurality of network devices with access to a plurality of masking servers having an interface to a plurality of destination servers over a network, wherein the masking devices operate in a coordinated manner;
  receiving requests to connect network devices in the at least one private network at the masking server, the requests comprising at least one identifier associated with the network devices;
  protecting the at least one identifier by substituting the at least one identifier with a masking identifier in each request to connect; and
  completing the connections for each request,
  wherein the masking server substitutes the identifier associated with the network devices using a Network Address Translator Exploder (NATE).

31. The method of claim 30 further comprising:
  connecting the network devices to the masking servers via a leased line interface.

32. The method of claim 30 further comprising:
  connecting the network devices to the masking servers via a virtual private network.

33. The method of claim 30 further comprising:
  connecting the network devices to the masking servers via packet source routing.

34. The method of claim 30 further comprising:
  connecting the network devices to the masking servers via proxy chaining by providing a local client proxy for each network device and receiving a user selection comprising a selected proxy server to use for the connection.

35. The method of claim 30 further comprising:
  partitioning at least one portion of one of the plurality of networks for protection.

36. The method of claim 35 further comprising:
  partitioning the at least one portion by selecting certain ports for protection.

37. The method of claim 35 further comprising:
  partitioning the at least one portion by designating connections for protection according to selected destinations.

38. The method of claim 35 further comprising:
  partitioning the at least one portion by designating connections for protection according to selected users.

39. The method of claim 30 wherein the step of providing access comprises:
  configuring the network devices to initiate connections to the masking server via a network bridge.

40. The method of claim 32 wherein the step of providing access comprises:
  configuring the network devices to initiate connections to the masking server via a VPN concentrator.

41. A method for gathering information from a destination server comprising:
  requesting a connection between a network device and the destination server on a network at one of a plurality of masking servers, wherein the masking devices operate in a coordinated manner, the connection comprising at least one identifier of the network device;
  substituting the identifier of the network device with at least one masking identifier in the connection at the one of the plurality of masking servers;
  completing the connection to allow communication between the network device and the destination server where the destination server does not have access to the identifier of the network device;
  receiving a request for selected information from the network device and sending the request to the destination server; and
  receiving the selected information from the destination server and sending the selected information to the network device,
  where the step of substituting the masking identifier comprises using a Network Address Translation Exploder ("NATE").

42. The method of claim 41 further comprising substituting the masking identifier.

43. The method of claim 41 where the step of substituting the at least one different masking identifier comprises the step of using a NATE to generate the new masking identifier.

44. The method of claim 41 further comprising selecting a second one of the plurality of masking servers, where the step of substituting the at least one different masking identifier is performed by the second one of the masking servers.

* * * * *

UNITED STATES PATENT AND TRADEMARK OFFICE
CERTIFICATE OF CORRECTION

PATENT NO. : 8,375,434 B2
APPLICATION NO. : 11/722497
DATED : February 12, 2013
INVENTOR(S) : Lance M. Cottrell et al.

It is certified that error appears in the above-identified patent and that said Letters Patent is hereby corrected as shown below:

In the Specification:

Column 15, line 37:

Please change "by one or masking devices" to --by one or more masking devices--

Column 16, line 11:

Please change "by one or masking devices" to --by one or more masking devices--

Column 17, line 11:

Please change "by one or masking devices" to --by one or more masking devices--

Signed and Sealed this
Fifteenth Day of October, 2013

Teresa Stanek Rea
*Deputy Director of the United States Patent and Trademark Office*